United States Patent
Neuman et al.

(10) Patent No.: US 10,247,995 B2
(45) Date of Patent: Apr. 2, 2019

(54) ELECTRO-OPTIC ELEMENT WITH HIGH DOUBLE IMAGE RATIO

(71) Applicant: Gentex Corporation, Zeeland, MI (US)

(72) Inventors: George A. Neuman, Holland, MI (US); Mario F. Saenger Nayver, Zeeland, MI (US); John S. Anderson, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/650,618

(22) Filed: Jul. 14, 2017

(65) Prior Publication Data

US 2018/0017834 A1 Jan. 18, 2018

Related U.S. Application Data

(60) Provisional application No. 62/363,054, filed on Jul. 15, 2016.

(51) Int. Cl.
*G02F 1/157* (2006.01)
*F21V 7/22* (2018.01)
(Continued)

(52) U.S. Cl.
CPC ............ *G02F 1/157* (2013.01); *F21V 7/22* (2013.01); *G02B 27/01* (2013.01); *G02F 1/0018* (2013.01);
(Continued)

(58) Field of Classification Search
CPC . B82Y 20/00; G02F 1/157; G02F 1/01; G02F 1/0121; G02F 1/155
(Continued)

(56) References Cited

U.S. PATENT DOCUMENTS

| 697,499 A | 4/1902 | Kromenaker |
| 6,111,684 A * | 8/2000 | Forgette ............... B60Q 1/2665 359/265 |

(Continued)

FOREIGN PATENT DOCUMENTS

| EP | 2131227 A2 | 12/2009 |
| WO | 2016081858 A1 | 5/2016 |

*Primary Examiner* — Mohammed A Hasan

(74) *Attorney, Agent, or Firm* — Price Heneveld LLP; Bradley D. Johnson

(57) ABSTRACT

A variable transmittance electro-optic assembly includes a first partially reflective, partially transmissive substrate defining first and second surfaces. A second partially reflective, partially transmissive substrate defines a third surface and a fourth surface. The first substrate and the second substrate are configured to be held in a parallel spaced apart relationship and sealed about a perimeter of the first and second substrates. An electro-optic material is positioned between the second surface and the third surface. The electro-optic assembly includes a principle transflector having a transflector coating on at least one of first and second surfaces. Low reflectance coatings are disposed on secondary surfaces of the variable transmittance electro-optic assembly. The electro-optic assembly has a high double image characteristic defined by a ratio of a reflectance of the transflector coating to a net reflectance of at least one of the secondary surfaces, and further wherein the ratio is greater than 50.

19 Claims, 9 Drawing Sheets

(51) Int. Cl.
*G02F 1/00* (2006.01)
*G02F 1/01* (2006.01)
*G02F 1/155* (2006.01)
*G02B 27/01* (2006.01)
*B60R 1/12* (2006.01)

(52) U.S. Cl.
CPC ............... *G02F 1/01* (2013.01); *G02F 1/155* (2013.01); *B60R 2001/1215* (2013.01); *G02B 2027/0118* (2013.01)

(58) Field of Classification Search
USPC ........................................................ 359/245
See application file for complete search history.

(56) References Cited

U.S. PATENT DOCUMENTS

| | | | |
|---|---|---|---|
| 6,166,848 A * | 12/2000 | Cammenga | B60Q 1/2665 359/265 |
| 6,654,070 B1 | 11/2003 | Rofe | |
| 9,709,869 B2 * | 7/2017 | Baumann | G02F 1/163 |
| 2003/0192991 A1 | 10/2003 | Rukavina et al. | |
| 2004/0160657 A1 | 8/2004 | Tonar et al. | |
| 2004/0233552 A1 | 11/2004 | Tonar et al. | |
| 2007/0206263 A1 | 9/2007 | Neuman et al. | |
| 2008/0218434 A1 | 9/2008 | Kelly et al. | |
| 2016/0147126 A1 * | 5/2016 | Cammenga | G02F 1/157 359/275 |

* cited by examiner

ELECTRO-OPTIC ELEMENT WITH HIGH DOUBLE IMAGE RATIO

CROSS-REFERENCE TO RELATED APPLICATION

This application claims priority to and the benefit under 35 U.S.C. § 119(e) of U.S. Provisional Application No. 62/363,054, filed on Jul. 15, 2016, entitled "ELECTRO-OPTIC ELEMENT WITH HIGH DOUBLE IMAGE RATIO," the disclosure of which is hereby incorporated herein by reference in its entirety.

FIELD OF THE DISCLOSURE

The present disclosure generally relates to an electro-optic device, and more particularly, to an electro-optic device having electro-optic elements with a high double image ratio.

SUMMARY OF THE DISCLOSURE

According to one aspect of the present disclosure, a variable transmittance electro-optic assembly includes a first partially reflective, partially transmissive substrate defining a first surface and a second surface. A second partially reflective, partially transmissive substrate defines a third surface and a fourth surface. The first substrate and the second substrate are configured to be held in a parallel spaced apart relationship and sealed about a perimeter of the first and second substrates. An electro-optic material is positioned between the second surface and the third surface. The electro-optic assembly includes a principle transflector having a transflector coating on at least one of first and second surfaces. Low reflectance coatings are disposed on secondary surfaces of the variable transmittance electro-optic assembly. The electro-optic assembly has a low double image characteristic defined by a ratio of a reflectance of the transflector coating to a net reflectance of at least one of the secondary surfaces, and further wherein the ratio is greater than 50.

According to another aspect of the present disclosure, a variable transmittance electro-optic assembly includes a first partially reflective, partially transmissive substrate defining a first surface and a second surface. A second partially reflective, partially transmissive substrate defines a third surface and a fourth surface. The first substrate and the second substrate are configured to be held in a parallel spaced apart relationship and sealed about a perimeter of the first and second substrates. An electro-optic material is positioned between the second surface and the third surface. A principle fixed transflector includes a transflector coating disposed on at least one of the first and second surfaces. The principle fixed transflector is configured such that a reflectance of p polarized light is angle stabilized. Low reflectance coatings are disposed on secondary surfaces of the variable transmittance electro-optic assembly, and are configured for p polarized light such that the electro-optic assembly has a high double image characteristic defined by a ratio of the reflectance of the transflector coating to a net reflectance of at least one of the secondary surfaces, and further wherein the ratio is greater than 100.

These and other features, advantages, and objects of the present disclosure will be further understood and appreciated by those skilled in the art by reference to the following specification, claims, and appended drawings.

DETAILED DESCRIPTION

Figure 1:
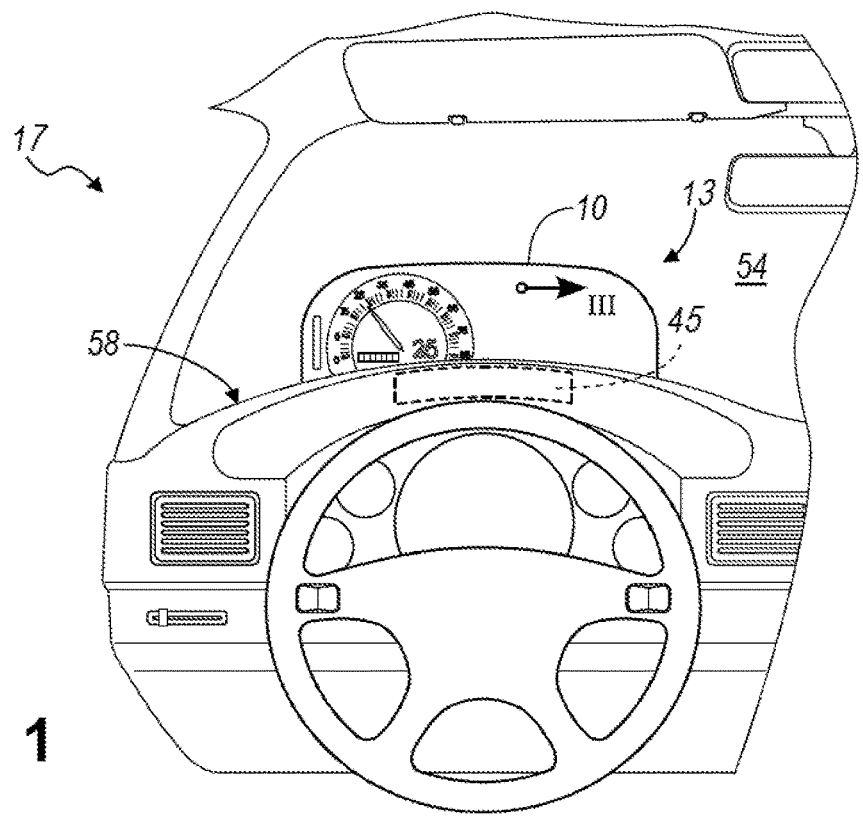
FIG. 1 is a front perspective view of a heads up display system incorporating an electro-optic-element, according to one example.

The present illustrated embodiments reside primarily in combinations of method steps and apparatus components related to an electro-optic element. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-9, reference numeral 10 generally designates an electro-optic assembly. The electro-optic assembly 10 may be utilized in a heads up display system 13 of a vehicle 17. The electro-optic assembly 10 can have a first partially reflective, partially transmissive glass substrate 12 and a second partially reflective, partially transmissive glass substrate 14. The first substrate 12 can have a first surface 16 and a second surface 18. The second substrate 14 can have a third surface 20 and a fourth surface 21. The first and second substrates 12, 14 can be positioned in a parallel spaced-apart relationship and can have a seal 30 substantially around a perimeter of the first and second substrates 12, 14. The first substrate 12 and the second substrate 14 define a cavity 34. An electro-optic material 38 is in the cavity 34 between the first and second substrates 12, 14. In at least one example, the electro-optic assembly 10 is configured to have a non-varying reflectance and a varying transmittance. A "clear state" of the electro-optic assembly 10 refers to the condition of maximum transmittance. The activation of the electro-optic material 38 may reduce the transmittance of the electro-optic assembly 10 to a "darkened state." The "low end" transmittance refers to the minimum transmittance attainable by the electro-optic assembly 10.

By way of explanation and not limitation, the electro-optic assembly 10 can be included in the heads up display (HUD) system 13 of the vehicle 17. In such an example, the electro-optic assembly 10 may function as a combiner screen to reflect a primary image projected by a projector 45. The electro-optic assembly 10 can be controlled to vary the amount of light transmission based on input from a control circuit. For example, in daylight conditions the electro-optic assembly 10 may be darkened to improve or increase the contrast ratio and allow for improved visibility of information projected on the electro-optic assembly 10 from the projector 45. The contrast ratio may represent the ratio of a primary reflected image from the projector 45 and the light transmitted through the electro-optic assembly 10 (e.g., in either the clear state or the darkened state).

Figure 1A:
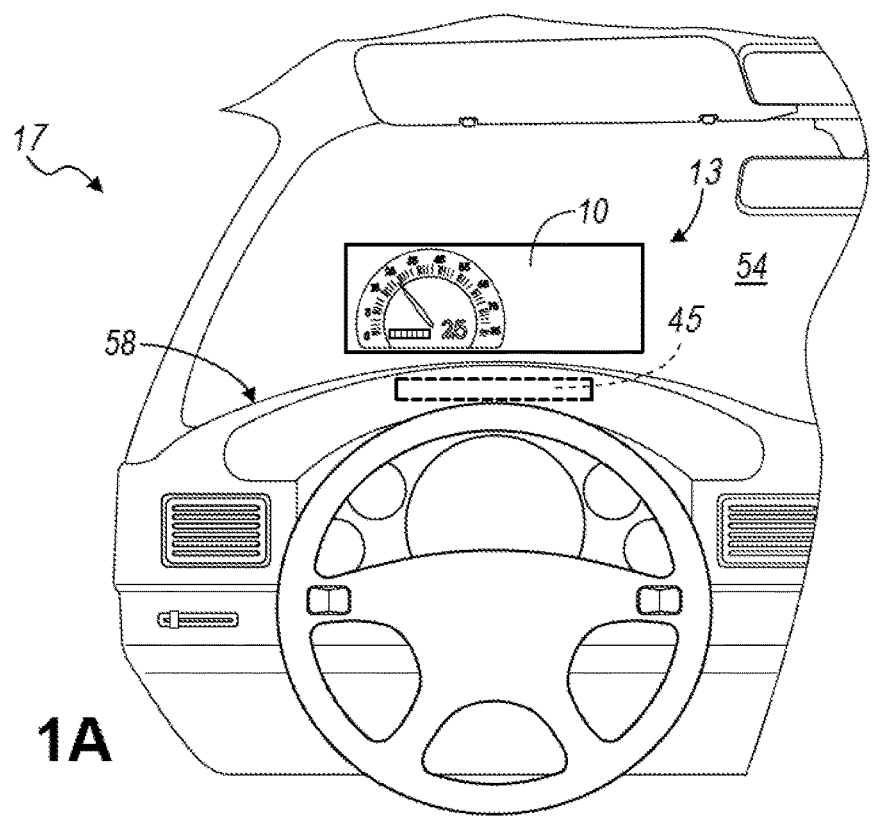
FIG. 1A is a front perspective view of a heads up display system incorporating an electro-optic-element, according to another example.

The heads up display system 13 is capable of use in a variety of applications, such as automotive and aerospace applications, to present information to a driver or pilot while allowing simultaneous forward vision. In some examples the heads up display system 13 may be provided vehicle rearward of a windscreen 54 and protruding from an instrument panel 58 (FIG. 1) while in other examples the electro-optic assembly 10 may be positioned directly on the windscreen 54 (FIG. 1A). The electro-optic assembly 10 may be any size, shape, bend radius, angle or position. The electro-optic assembly 10 can be used to display many vehicle related functions or driver assistance systems such as alerts, warnings or vehicle diagnostics. In the depicted examples, the speed of the vehicle 17 is being displayed on the electro-optic assembly 10.

In regards to heads up display systems 13, the image projected onto the electro-optic assembly 10 should be bright enough to see in any condition. This is particularly challenging when the lighting outside the vehicle 17 is bright. The contrast between the light from the projector 45 and the lighting behind the electro-optic assembly 10 can be low on a bright sunny day. While a brighter, more intense lighting source (e.g., the projector 45) improves the contrast, increasing the display brightness may not be the most economical solution and a display that is bright enough to provide reasonable contrast in very bright daylight conditions will be too bright in other conditions. Although controls may be used to deal with variations in brightness, the specific background is ever changing in a moving vehicle, and depends in part on the position of the driver's eyes. In accordance with one example, the electro-optic assembly 10 can be configured to lower the transmission and/or to increase the contrast ratio.

Depending on the application, there may be a need for a higher or lower transmittance in the clear state, different reflectance values for optimal contrast ratios, and/or broader dynamic range of the transmittance levels. The initial reflectance and range of transmittance properties is further complicated by the capabilities of the projector 45 employed with the heads up display system 13 and the light output capabilities of the projector 45 along with the light transmittance levels for the windscreen 54. The windscreen 54 will have a direct impact on the contrast ratio and visibility of the image from the heads up display system 13. There are a number of factors which affect the transmittance levels of the windscreen 54. The minimum light transmittance is based on the rules in the location in which the vehicle 17 is sold but higher transmittance levels may be present based on how the vehicle 17 is equipped and marketed. This range of factors creates the need for solutions which can be adapted to different vehicle and environmental conditions.

Another aspect that should be considered when utilizing the heads up display system 13 is a secondary reflection from the first through fourth surfaces 16, 18, 20, 21 of the first and second substrates 12, 14. Reflection off of the first through fourth surfaces 16, 18, 20, 21 may create a double image effect from secondary reflections that do not perfectly align with the primary reflected image (e.g., due to geometries of the components of the electro-optic assembly 10). The double image that may be formed from secondary reflections off of the first through fourth surfaces 16, 18, 20, 21 may cause the primary image projected by the projector 45 and reflected by the electro-optic assembly 10 to appear blurry or unclear.

According to one example, the electro-optic assembly 10 can be assembled using two approximately 1.6 mm glass substrates (e.g., the first and second substrates 12, 14) which are both bent with a spherical radius of approximately 1250 mm. Other thicknesses for the first and second substrates 12, 14 may also be used. In other examples the first and second substrates 12, 14 may be bent to have a "free-form" shape. The desired shape is one in which the resultant primary reflected image "appears" to be forward of the electro-optic assembly 10 and forward of the vehicle 17. The exact surface contour needed to attain this characteristic is a function of the properties of the projector 45, projector 45 and driver location, as well as the electro-optic assembly 10 location relative to the other two locations. Having the image projected forward of the vehicle 17 allows the driver to obtain the desired information without having to change their focal distance. In a traditional heads up display located within the vehicle 17, the driver's eyes often have to refocus to the shorter viewing distance thus decreasing the time spent viewing the road. Furthermore, the driver's eyes will also then have to re-focus on the road ahead, which further decreases the time spent viewing the road and forward conditions. The shape of the electro-optic assembly 10 should also be selected so as to preserve the basic characteristics of the projected image (i.e., straight lines remain straight, aspect ratios of images are preserved, etc.).

Figure 2:
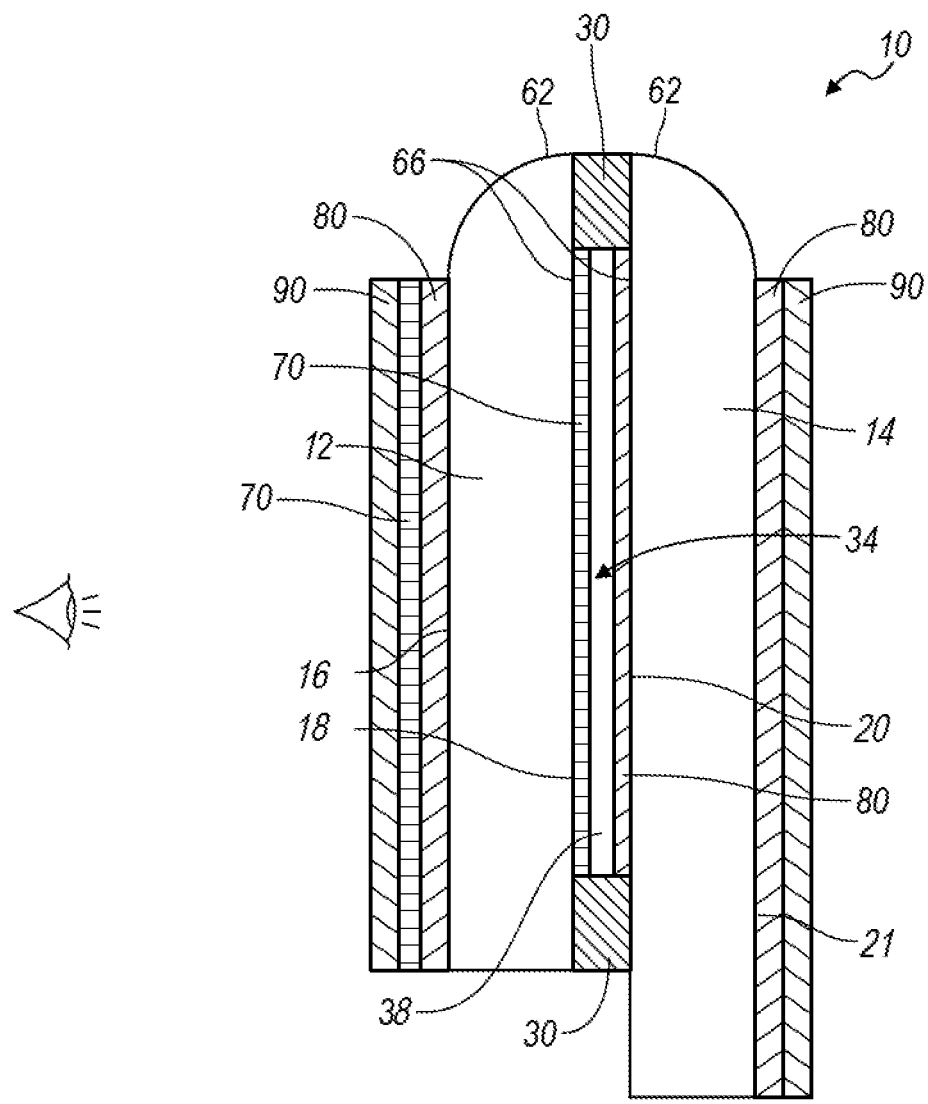
FIG. 2 is a cross-sectional view of an electro-optic assembly of the present disclosure.

Referring now to FIG. 2, the first substrate 12 includes the first surface 16 and the second surface 18. The second surface 18 can be coated with indium tin oxide with a sheet resistance of approximately 12 ohms/sq. The first surface 16 can be concave and can be coated with chromium (Cr). The coated first substrate 12 may have a transmission of approximately 37.8% and reflectance of approximately 25.4%. The second substrate 14 defines the third and fourth surfaces 20, 21. The third surface 20 can be coated with indium tin oxide with a sheet resistance of approximately 12 ohms/sq.

From the first surface 16, the electro-optic assembly 10 can have a clear state reflectance of approximately 25% and a transmittance of approximately 24%. The electro-optic assembly 10 can have a low end, or state, transmittance of approximately 10.5%. Alternatively, in other examples, the high end, or state, transmittance of the electro-optic assembly 10 may be greater than 45% or even 60%. The characteristics of the electro-optic assembly 10 may also be altered so that the low end transmittance is less than 7.5% or even less than 5% in the darkened state. In some examples, transmittance levels down to 2.5% or less may be desirable. Increasing the high-end transmittance may be obtained by the use of coatings and materials which have low absorption, as will be described herein. Lower low-end transmittances may be obtained through the inclusion of materials which have higher absorption. If a wide dynamic range is desired, then low absorption materials may be used in combination with electro-optic materials and cell spacings (e.g., the space between the first and second substrates 12, 14) which attain higher absorbance in the activated state. Those skilled in the art will recognize that there exists a multitude of combinations of coatings and electro-optic materials, cell spacings and coating conductivity levels which can be selected to attain particular device characteristics.

To provide electric current to the first and second substrates 12, 14 and electro-optic material 38, electrical elements may be provided on opposing sides of the first and second substrates 12, 14 (e.g., the second and third surfaces 18, 20) to generate an electrical potential therebetween. In one example, a J-clip may be electrically engaged with each electrical element, and element wires extend from the J-clips to a primary printed circuit board. To provide the greatest surface area through the electro-optic assembly 10, the contacts are located along one side of the device. In this example, there is a back plate and top plate offset to allow contact such as a bus clip. Other contact designs are possible including the use of conductive ink or epoxy.

According to various examples, the electro-optic material 38 may be an electrochromic medium. In electrochromic examples, the electro-optic material 38 may include at least one solvent, at least one anodic material, and at least one cathodic material. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRE-SELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRE-SELECTED COLOR," U.S. Pat. No. 6,241,916 entitled "ELECTROCHROMIC SYSTEM," U.S. Pat. No. 6,193,912 entitled "NEAR INFRARED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES"; U.S. Patent Application Publication No. 2002/0015214 A1 entitled "ELECTROCHROMIC DEVICE"; and International Patent Application Serial Nos. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," PCT/EP98/03862 entitled "ELECTROCHROMIC POLYMER SYSTEM," and PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," which are herein incorporated by reference in their entirety. The first and second substrates 12, 14 are not limited to glass elements but may also be any other element having partially reflective, partially transmissive properties.

According to various examples, a perimeter band of the electro-optic assembly 10 can be modified by adding or removing material to block or obscure the view of the seal 30 and contact materials. In a first example, an outside perimeter of the first and fourth surfaces 16, 21 can be etched to provide substrates with a frosted perimeter. In frosted perimeter examples, the perimeter band is formed by damaging both the first and fourth surfaces 16, 21 using a $CO_2$ laser to form a frosted band approximately 4 mm wide. Additionally or alternatively, edges of the first and fourth surfaces 16, 21 can be ground and/or polished. Further, a spectral filter material (e.g., a chrome or metal ring) or light scattering material may be added to the perimeter of the first and/or second substrates 12, 14 (e.g., any of the first through fourth surfaces 16, 18, 20, 21) to aid in concealing the seal 30. The spectral filter can block the view of the seal 30 and also provides ultraviolet (UV) protection for the seal 30. In another example of the spectral filter, chromium oxynitride, or another dark coating, may be deposited on the perimeter of the electro-optic assembly 10 to create a dark ring which acts as the spectral filter. The spectral filter material may be selectively deposited, or may be deposited over the entire surface and then selectively removed, to create the perimeter band, such as with selective laser ablation. Additionally or alternatively, the seal 30 may be generally clear, colorless, or configured to scatter light. In such examples, the frosted band can extend slightly inboard of the seal 30. It will be understood that any of the above described techniques of concealing the seal 30 may be used alone, or in conjunction with, any of the other disclosed concealment techniques for the seal 30.

In the depicted example, each of the first and second substrates 12, 14 include a rounded edge 62 and a contact edge 66 that is not rounded. The non-rounded contact edge 66 may be desirable for ease of contact, and if the device is supported by that edge, there would be no need to round the first and second substrates 12, 14 along the contact edge 66. Any exposed edge on the electro-optic assembly 10 may be generally rounded. The radius of curvature of the rounded edges 62 may be greater than approximately 2.5 mm.

With reference again to FIG. 2, the electro-optic assembly 10 may include a transflective coating 70, an anti-reflection coating 80, and a scratch-resistant coating 90. In the depicted example, the transflective coating 70 is positioned proximate the first surface 16, but may additionally or alternatively be positioned on the second surface 18 without departing from the teachings provided herein. In the depicted example, the anti-reflection coating 80 is on the first, third and fourth surfaces 16, 20, 21, but it will be understood that the anti-reflection coating 80 may additionally or alternatively be positioned on the second surface 18 without departing from the teachings provided herein. In some examples, the anti-reflection coating 80 is positioned on at least one of the first and second surfaces 16, 18, and may be positioned on whichever of the first and second surfaces 16, 18 is opposite the surface onto which the transflective coating 70 is positioned. The anti-reflection coatings on the second and third surfaces 18, 20, in certain examples, function as electrodes (e.g., an antireflective electrode) to enable darkening of the electro-optic material 38. It will be understood, that when transflective coating 70 is located on the second surface 18, in certain examples, it may also serve a dual purpose and also act as an electrode. In the depicted example, the scratch-resistant coating 90 is positioned proximate the first and fourth surfaces 16, 21. It will be understood that although described as separate layers, the transflective coating 70, the anti-reflection coating 80 and/or the scratch-resistant coating 90 may share properties which function as the other coatings, as described in greater detail herein.

As an example, the transflective coating 70 may include a dielectric-metal bilayer that provides a higher range of attainable values for reflectance and transmission than a single metallic layer. The selection of the metal and the selection of its thickness and the tuning of the thickness, refractive index and absorption of the dielectric material can be employed to achieve a particular reflectance and transmission level. In some embodiments, the bi-layer design may not provide adequate tunability. Therefore, it may be advantageous to have a transflective coating 70 that allows more flexibility in terms of reflectance and transmittance values, especially when lower transmittance values are sought. Accordingly, in another example of the transflective coating 70, such characteristics can be obtained with a multi-layer coating such as a metal/dielectric/metal structure (MDM). Generally, an M-layer of the MDM coating includes one or more of chromium, molybdenum, nickel, Inconel, indium, palladium, osmium, tungsten, rhenium, iridium, rhodium, ruthenium, stainless steel, tantalum, titanium, copper, gold, platinum, any other platinum group metals, zirconium, vanadium AlSi alloys, and alloys and/or combinations thereof. It will be understood that any of the aforementioned metals may be utilized for the single or bilayer examples of the transflective coating 70. In some examples, combinations of metals and dielectric materials may depend on whether the transflective coating 70 is configured on the first surface 16 or the second surface 18 for durability or electrode properties. The dielectric material may be selected from one or more of the following: ITO, $SnO_2$, SiN, $MgF_2$, $SiO_2$, $TiO_2$, $F:SnO_2$, $NbO_x$, $TaO_x$, indium zinc oxide, aluminum zinc oxide, zinc oxide, electrically conductive $TiO_2$, $CeO_x$, ZnS, chromium oxide, $ZrO_x$, $WO_3$, nickel oxide, $IrO_2$, $NiO_x$, $CrO_x$, $NbO_x$, and $ZrO_x$, or other material with a refractive index between about 1.37 and about 4. It will be understood that any of the aforementioned dielectrics may be utilized for the bilayer example of the transflective coating 70.

The electro-optic assembly 10 may be configured into two options which are differentiated by the location of the principle transflector layer. The principle transflector may include generally uniform reflectance. The surfaces without the principle transflector are referred to as the secondary surfaces. The electro-optic assembly 10 is differentiated from other electrochromic devices, such as mirror assemblies, in that the reflectance is substantially fixed, while for auto dimming mirrors, the reflectance is variable. The electrochromic media is present behind a fixed reflectance principle transflector coating, which can be positioned at either the first surface 16 or the second surface 18, and therefore the electrochromic media will not attenuate the reflectance of the principle transflector. The reflectance of the principle transflector coating, ideally, is the only reflectance desired. Without properly designed coatings the reflectance off of the secondary surfaces will be relatively high. The potential for significant reflectance off of the secondary surfaces may therefore cause double image. Coatings may be applied to the secondary surfaces to reduce the reflectance off of the surfaces and thus reduce the potential for double image. The Double Image Ratio (DIR), described herein, defines conditions wherein objectionable double image may be avoided. Low reflectance coatings may be applied to the secondary surfaces. The low reflectance coatings will include reflectance spectra configured to anti-reflect the display light output intensity versus wavelength.

Figure 3A:
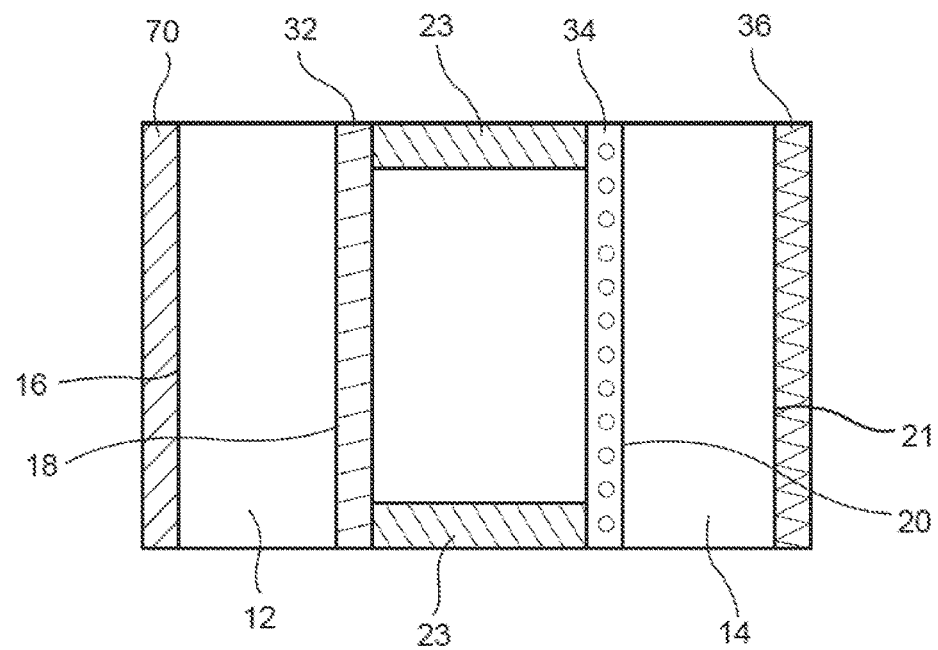
FIG. 3A is a schematic side cross-sectional view of one configuration of a transflective coating on a transparent electrode of the present disclosure.

With reference now to FIG. 3A, in the first configuration, the transflective coating 70 is on the first surface 16. On the second surface 18, the transparent electrode 32 is present. On the third surface 20, the transparent electrode 34 is present. On the fourth surface 21, the anti-reflection coating 36 is present. Seals 23 are disposed between the first substrate 12 and the second substrate 14.

Figure 3B:
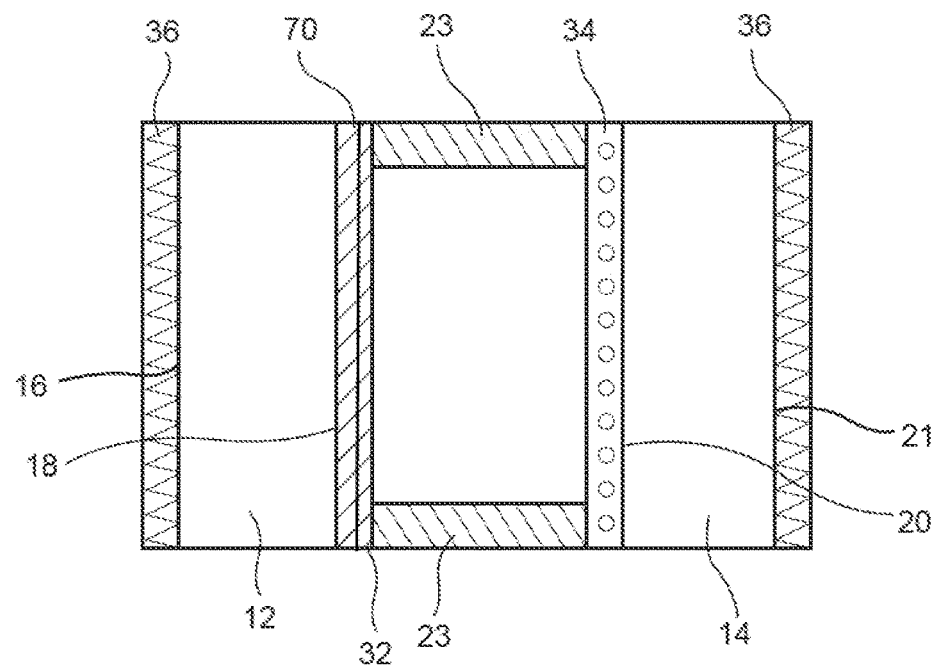
FIG. 3B is a schematic side cross-sectional view of another configuration of a transflective coating on a transparent electrode of the present disclosure.

With reference now to FIG. 3B, the second configuration of the transflective coating 70 is on the second surface 18. On the first surface 16, the anti-reflection coating 36 is present. On the third surface 20, the transparent electrode 32 is present. On fourth surface 21 the anti-reflection coating 36 is present. The functionality and options of each of these layers are detailed herein as to how they relate to the requirements of the overall electro-optic assembly 10, which has acceptable DIR.

Figure 3C:
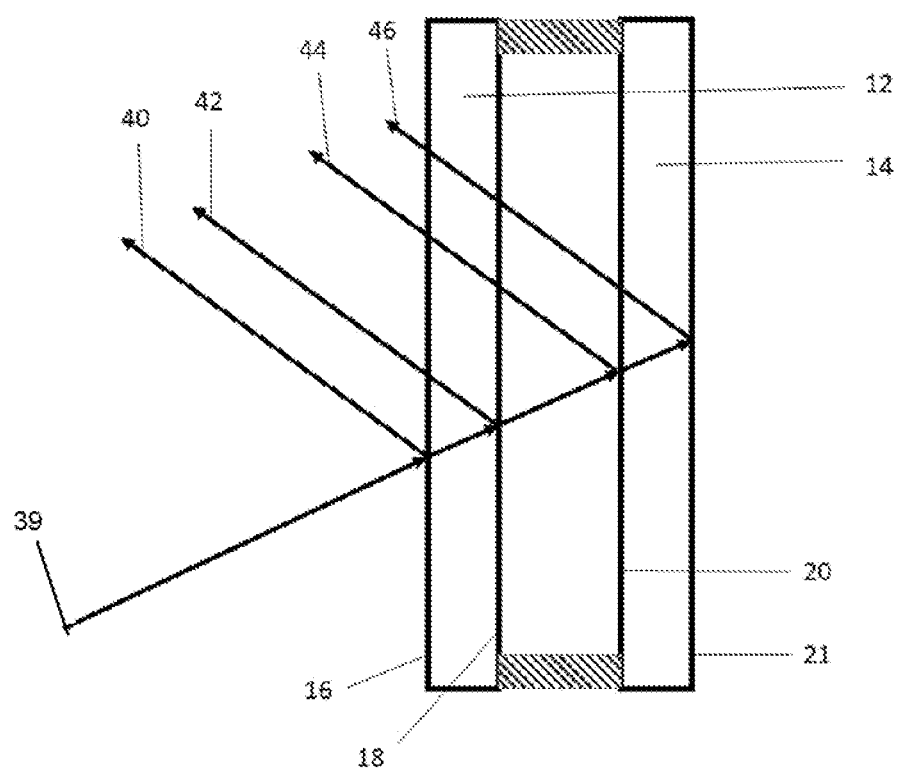
FIG. 3C is a schematic side cross-sectional view of the electro-optic assembly of the present disclosure with ray traces demonstrating the reflectance off of the different interfaces.

With reference now to FIG. 3C, ray tracing of an incident light 39 and subsequent reflectances off of the surfaces of the electro-optic assembly 10 is illustrated. The incident light 39 is reflected off of the first surface 16 with a reflected beam 40, off of the second surface 18 with a reflected beam 42, off of the third surface 20 with a reflected beam 44, and off of the fourth surface 21 with a reflected beam 46. The DIR can be quantified by calculating the ratio, or double image ratio (DIR) of the reflectance off of the principle transflector to the net reflectance off of each of the secondary surfaces or DIR=principle transflector reflectance/secondary surface net reflectance. With this metric, electro-optic assemblies with higher DIR will have less double image. The net reflectance is the absolute reflectance off of a surface attenuated by any absorptive materials between the surface and the viewer. There will be a unique DIR for each of the secondary surfaces relative to the surface with the principle transflector. In different embodiments, reflectance can be quantified as the eye weighted reflectance (Y) in the International Commission on Illumination (CIE) color system, a simple average over a given wavelength range, a weighted average, wherein the reflectance is normalized to the intensity variation of the display light, or may be based on the reflectance intensity of discrete wavelength bands. Therefore, the DIR for an electro-optic assembly may also be based on the net eye weighted reflectance (Y), average net reflectance values, the weighted average net reflectance, or the net reflectance for discrete wavelength bands. Additionally, as described below, the DIR for a given electro-optic assembly may have different DIR values at different viewing angles. When evaluating whether an electro-optic device has acceptable double image or DIR values, acceptability criteria may be based on an average of DIR values for each surface for any of these reflectance criteria, an average of DIR values for each wavelength band for a given surface, combinations of these approaches, or, alternatively, the maximum DIR from any of these options may be used. It will be appreciated by one skilled in the art that double image may arise from one or more wavelength, wavelength band, or series of discrete wavelengths and the DIR values will be optimized based on the particulars of a given display/HUD combiner combination and will be within the scope of this invention. The DIR may be greater than 50. In other instances, an electro-optic device can be configured to have a DIR that is greater than 100, or even greater than 200, or greater than 400. The double image may be worse in the clear state of the electro-optic device, but it is understood that the desired DIR values apply to the clear state, darkened state, and intermediate states.

In order to calculate the DIR, the attenuation of the light beams as they pass through the different substrates and coatings needs to be calculated in order to attain the net reflectance values. The attenuation of the intensity can be calculated in detail using thin film modeling software, such as Essential Macleod, or equivalent programs. These programs take into account the multiple reflectances that are needed for exact calculations of the attenuation of the light but, the values may be estimated by simple multiplicative factors. The net reflectance is the absolute reflectance, or reflectance off of a surface taken in isolation, reduced by losses passing through other components of the electro-optic assembly 10. For example, the Net Second Surface 18 Reflectance=(100%−First Surface 16 Reflectance)/100%× [(First Substrate 12 Internal Transmittance)/100%]$^2$×Absolute Second Surface 18 Reflectance which is: (100%-4%)/100%×[(98%)/100%]$^2$×4%=3.7%. In this manner, the net reflectance off of each surface may be estimated, allowing the calculation of DIR values for each surface. As more substrates, surfaces, or coatings are added with particular reflectance, transmittance, and absorption, the equation above can be expanded to accommodate the particulars of the electro-optic assembly 10.

Table 1 has examples of different theoretical device constructions that demonstrate the implications of different coatings and absorbing elements on net reflectance values and DIR metrics. The reflectance of each surface is shown, wherein the reflectance is what would be considered for the interface with or without a coating. The internal transmittance of substrates is included, which can be adjusted to attenuate the absorption in the substrate material. The net reflectance values for the different surfaces are given and represent the effective reflectance observed by a viewer after the intensity is attenuated by passing through forward positioned elements in the assembly. The net transmittance for each substrate is also listed and includes the contributions from surface reflectances, either coated or uncoated, and the internal transmittance of the substrate. The net transmittances of the two substrates can be multiplied together to get the net transmittance for the device. The DIR values for each of the secondary surfaces is included as defined above.

As shown in Table 1, the DIR value is approximately 8.5 for each of secondary surfaces 18, 20, and 21. Example A shows clear glass for both substrates, with an internal transmittance of 98%, a 25% absorption-free transflector on the first surface 16, and no coatings on secondary surfaces 18, 20, and 21. The transmittance of the electro-optic assembly 10 is high at about 66%. The low values of the DIR would be indicative of high double image.

TABLE 1

| Example | Description | Surface 1 Reflectance | Substrate 1 Internal Transmittance | Surface 2 Reflectance | Net Surface 2 Reflectance | Net Substrate 1 Transmittance |
| --- | --- | --- | --- | --- | --- | --- |
| A | 25% Principle Transflector Surface 1 Uncoated Secondary Surfaces | 25 | 98 | 4 | 2.9 | 71.5 |
| B | 25% Principle Transflector Surface 1 Uncoated Secondary Surfaces Absorbing Substrate 1-net 40% device transmittance | 25 | 59.3 | 4 | 1.8 | 44.4 |
| C | 25% Principle Transflector Surface 1 Uncoated Secondary Surfaces Absorbing Substrate 2-net 40% device transmittance | 25 | 98 | 4 | 2.54 | 73.5 |
| D | 25% Principle Transflector Surface 1 Secondary Surfaces set to 1.2% reflectance Absorbing Substrate 1-net 40% device transmittance | 25 | 55.6 | 1.2 | 0.5 | 41.7 |
| E | 25% Principle Transflector Surface 1 Secondary Surfaces set to 0.6% reflectance Absorbing Substrate 1-net 40% device transmittance | 25 | 55.6 | 0.6 | 0.25 | 41.7 |

TABLE 1-continued

| | | | | | | |
|---|---|---|---|---|---|---|
| F | 25% Principle Transflector Surface 1<br>Secondary Surfaces set to 0.3% reflectance<br>Absorbing Substrate 1-net 40% device transmittance | 25 | 55.6 | 0.3 | 0.35 | 41.7 |
| G | 35% Principle Transflector Surface 1<br>Secondary Surfaces set to 0.3% reflectance<br>Absorbing Substrate 1-net 40% device transmittance | 35 | 63.2 | 0.3 | 0.32 | 41.1 |
| H | 20% Principle Transflector Surface 1<br>Secondary Surfaces set to 0.3% reflectance<br>Absorbing Substrate 1-net 40% device transmittance | 20 | 31.3 | 0.3 | 0.12 | 41.1 |
| I | 80% Principle Transflector Surface 1<br>Secondary Surfaces set to 0.3% reflectance<br>Low Absorbing Substrate 1 | 80 | 98.0 | 0.3 | 0.06 | 19.6 |
| J | 80% Principle Transflector Surface 1<br>Secondary Surfaces set to 2.0% reflectance<br>Low Absorbing Substrate 1 | 80 | 98.0 | 2.0 | 0.40 | 19.6 |
| K | 25% Principle Transflector Surface 2<br>Secondary Surfaces set to reflectance values to net DIR values of 200<br>Low Absorbing Substrate 1 | 0.12 | 58.0 | 25.5 | 24.99 | 73.0 |

| Example | Surface 3 Reflectance | Net Surface 3 Reflectance | Substrate 2 Internal Transmittance | Surface 4 Reflectance | Net Surface 4 Reflectance |
|---|---|---|---|---|---|
| A | 4 | 2.9 | 98 | 4 | 2.9 |
| B | 0.0 | 1.8 | 98 | 4 | 1.7 |
| C | 4 | 2.54 | 62.4 | 4 | 1.8 |
| D | 1.2 | 0.5 | 98.0 | 1.2 | 0.5 |
| E | 0.6 | 0.25 | 98.0 | 0.6 | 0.25 |
| F | 0.3 | 0.13 | 58.0 | 0.3 | 0.12 |
| G | 0.3 | 0.12 | 98.0 | 0.3 | 0.12 |
| H | 0.3 | 0.22 | 95.0 | 0.3 | 0.12 |
| I | 0.3 | 0.06 | 98.0 | 0.3 | 0.06 |
| J | 2.0 | 0.39 | 98.0 | 2 | 0.38 |
| K | 0.2 | 0.12 | 98.0 | 0.17 | 0.12 |

| Example | Net Substrate 1 Transmittance | Net Electro-Optic Assembly Transmittance | DIR S1R/S2R | DIR S1R/S3R | DIR S1R/S4R |
|---|---|---|---|---|---|
| A | 90.0 | 66.2 | 8.5 | 8.5 | 8.7 |
| B | 90.0 | 40.0 | 14.1 | 14.1 | 14.3 |
| C | 54.4 | 40.0 | 8.5 | 8.5 | 13.6 |
| D | 95.6 | 39.8 | 50.0 | 50.0 | 51.0 |
| E | 96.8 | 40.3 | 100.0 | 100.0 | 102.0 |
| F | 97.4 | 40.6 | 200.0 | 200.0 | 204.1 |
| G | 97.4 | 40.0 | 284.1 | 284.1 | 289.9 |
| H | 97.4 | 40.0 | 162.3 | 162.3 | 165.6 |
| I | 97.4 | 19.1 | 1360.5 | 1360.5 | 1388.3 |
| J | 94.0 | 18.4 | 200.0 | 204.1 | 208.2 |
| K | 97.7 | 71.3 | 200.0 | 200.0 | 200.0 |

For illustrative, non-limiting purposes, the internal transmittance of the substrates may be decreased as a means to lower the transmittance of the electro-optic assembly 10 and demonstrate the influence of absorption on the DIR values. In example B, the internal transmittance of first substrate 12 is mathematically decreased to attain a device transmittance of 40%. Since first substrate 12 is in front of secondary surfaces 18, 20, and 21 the DIR is increased to approximately 14 for each of these surfaces. The net reflectance of the secondary surfaces is reduced due to the absorption of the light as it passes through first substrate 12, which leads to the increased DIR. In example C, the device transmittance is reduced again to 40% by decreasing the internal transmittance of second substrate 14. In this example, second and third surfaces 18 and 20, respectively, are located in front of the absorbing element (second substrate 14) and the DIR is not altered for these surfaces and is equivalent to example A. The DIR from the fourth surface 21 is the only surface that increased. This analysis shows that for proper double image management, the system as a whole needs to be analyzed and one cannot simply consider the absolute reflectance of any one surface alone. The location of absorbing elements relative to the principle transflector will alter the net reflectance off of the surfaces leading to different DIR values.

Examples D, E, F, G, and H in Table 1 show the calculated DIR values for different theoretical assemblies. The uncoated secondary surfaces 18, 20, and 21 of examples A, B, and C produce unacceptable DIR values. Example D is a similar construction as example B with an absorbing first substrate with internal transmittance adjusted so that the net transmittance of the electro-optic assembly 10 is about 40% but with coatings on the secondary surfaces. Example D demonstrates that a DIR value of 50 may be obtained with a 25% principle transflector and a net reflectance of 0.5 from the secondary surfaces. In some embodiments, this level of a DIR will provide acceptable double image, but in the cases where improved double image is needed, the coatings on secondary surfaces 18, 20, and 21 can be improved to provide a lower net reflectance and corresponding higher DIR values. Examples E and F have lower net reflectance values on the secondary surfaces, 0.25 and 0.13, respectively, which results in DIR values of about 100 and 200, respectively. The higher DIR values result in reduced double image.

Example G shows the DIR values for an electro-optic assembly which a 35% principle reflectance and a transmittance of 40%. As with the previous examples, the absorption of the first substrate 12 is theoretically altered to attain the 40% transmittance for the electro-optic assembly 10. The secondary net reflectance values are 0.13 in this example, which results in DIR values of about 280. Example H shows the DIR values for an electro-optic assembly 10, which has a 20% principle reflectance and a transmittance of 40%. As with the previous examples, the absorption of the first substrate 12 is theoretically altered to attain the 40% transmittance. The secondary reflectance values are 0.13 in this example, which results in DIR values of about 160. These examples demonstrate the impact of the principle reflectance on the DIR values with comparable net reflectance values off of the secondary surfaces. This further supports the need to look at the system as a whole to optimally manage double image. In practice, the absorption of the substrate, the electrochromic media, the coatings on surfaces 16, 18, 20 and 21 may be adjusted individually or in combination to tune the transmittance of the electro-optic assembly 10 and provide appropriate DIR values for the electro-optic assembly 10.

The net reflectance off the secondary surfaces is less than about 0.5, less than about 0.25, and less than about 0.13. This analysis used a principle transflector on the first surface 16 for simplicity, but a comparable analysis may be made if the principle transflector is on the second surface 18. The DIR and net reflectance values needed for acceptable double image will be the same as described above, though the absolute reflectance of the secondary surfaces, independent of the rest of the system, may be significantly different to attain the appropriate net reflectance values and DIR values. In examples A-H, the transmittance of the electro-optic assembly 10 was lowered by decreasing the internal transmittance (increased absorption) of the substrates, but the absorption of the principle transflector could be also increased to attain the desired transmittance and help reduce the net reflectance off of the secondary surfaces. Example coatings, detailed herein, demonstrate how various principle transflector, electrode, and anti-reflection layers are suitable for use in different combinations to attain the appropriate net reflectance and DIR targets for an optimal electro-optic device with good double image characteristics.

When displaying an image, it is important that the color rendering of the display is correct. The output intensities of the different colors from the display can be adjusted to compensate for any variations in the reflectance of the coatings. The coatings may have relatively consistent reflectance across the visible spectrum or may be configured to have desired reflectance corresponding with the output bands of the display. The reflected and transmitted color rendering of the electro-optic assembly 10 can be controlled by varying the thicknesses, layer sequence, and adequate selection of materials of the coatings on each or in some of the first, second, third, and fourth surfaces 16, 18, 20, 21. In the case of the principle transflector being on the first surface, the reflected color rendering will be dominated by the characteristics of the principle transflector. In the case when the principle transflector is on second surface, the reflected color rendering will also be affected by any absorption characteristics of the first substrate and the first surface anti-reflection coating. In contrast to the reflected color rendering, which, as noted, is dominated by the principle transflector, the transmitted color rendering is a composite of all coatings and substrate transmittances. In some embodiments, it may be important to have either a high reflected or transmitted color rendering or both. The color rendering can be quantified in a number of ways. The color rendering index (CRI), of the electro-optic assembly 10 should be greater than 85, greater than 90, and most desirably greater than 95. Alternatively, in units of $c^*=\sqrt{(a^{*2}+b^{*2})}$, where $a^*$ and $b^*$ are color parameters of the CIELAB color system, the color of the coating should have a value less than about 20, more desirably less than about 10, and most desirably less than about 5. Either of these metrics will describe a surface wherein the display colors will be true or approximately match those of the output device. In other embodiments, the coating can be tuned to match the output of the display to enhance or compensate to achieve the desired colors.

Figure 4:
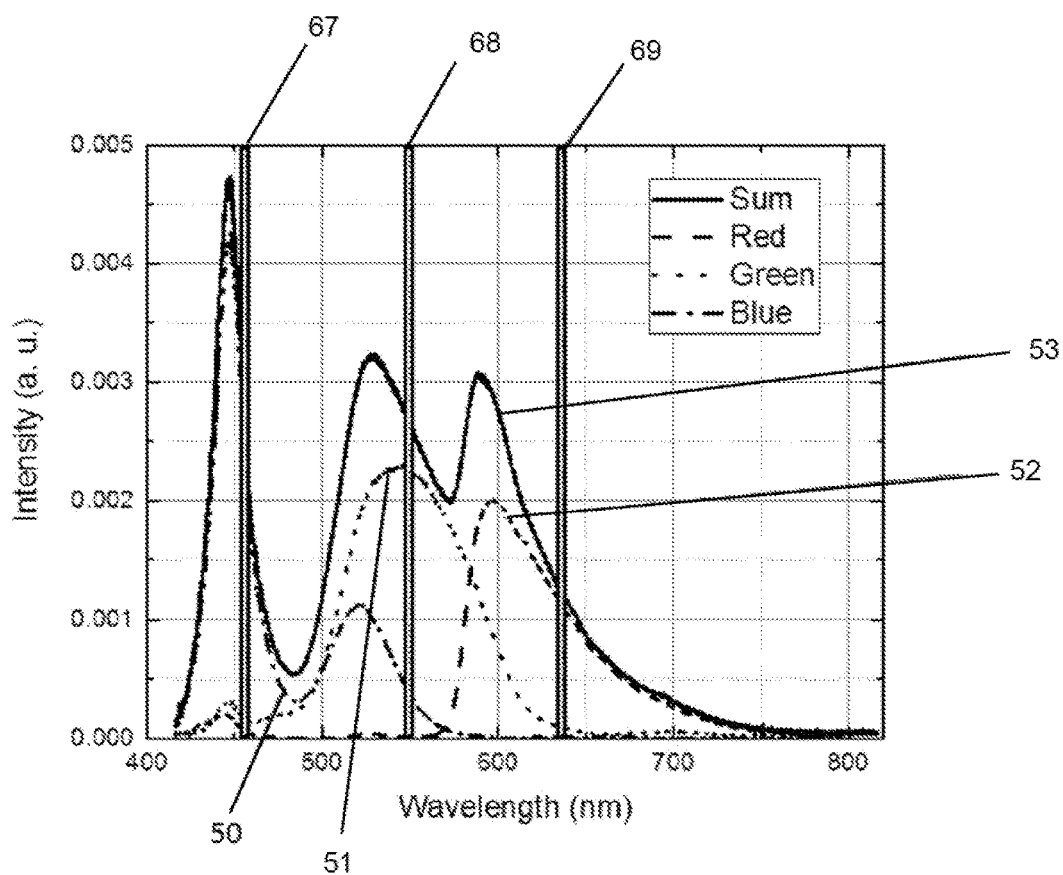
FIG. 4 is a graph illustrating intensity versus wavelength for one aspect of the present disclosure.

The calculation of the DIR can be influenced by the spectrum of the light coming from the display. A broad band transflector with relatively uniform reflectance may be suitable for most applications, but there may be embodiments wherein the light coming from the display is not uniform in intensity as a function of wavelength. A uniform reflectance is one wherein the intensity of reflectance at any wavelength is within about +/−10% of the average for the wavelengths corresponding to the output of the display. A transflector with non-uniform reflectance has increased reflectance at one or more wavelength bands, wherein the increase reflectance is greater than about 10% from the average reflectance. As illustrated in FIG. 4, two types of display output are shown. Curves 50, 51, and 52 represent the light bands associated with blue, green, and red light, respectively. The sum of these bands is a curve 53. The reflectance off of each surface used to calculate the DIR values may be normalized to the sum intensity curve 53. In this way, the DIR values will best represent the intensity of the actual light projected to the electro-optic assembly 10. An alternative display technology may employ monochromatic light at one or more wavelengths. FIG. 4 shows three wavelengths, but it should be understood that fewer or more bands may be employed while not deviating from the spirit of the invention. In this embodiment, the three light output bands are relatively each monochromatic. Bands 67, 68, and 69 represent blue, green, and red light, respectively. In this example, the reflectance and DIR may be calculated at each individual wavelength or as a combination of each wavelength band. The coatings employed on each surface may then be optimized to best match the intensity profile of the light projected from the display. The principle transflector may include enhanced reflectance corresponding to the light output bands.

Figure 5:
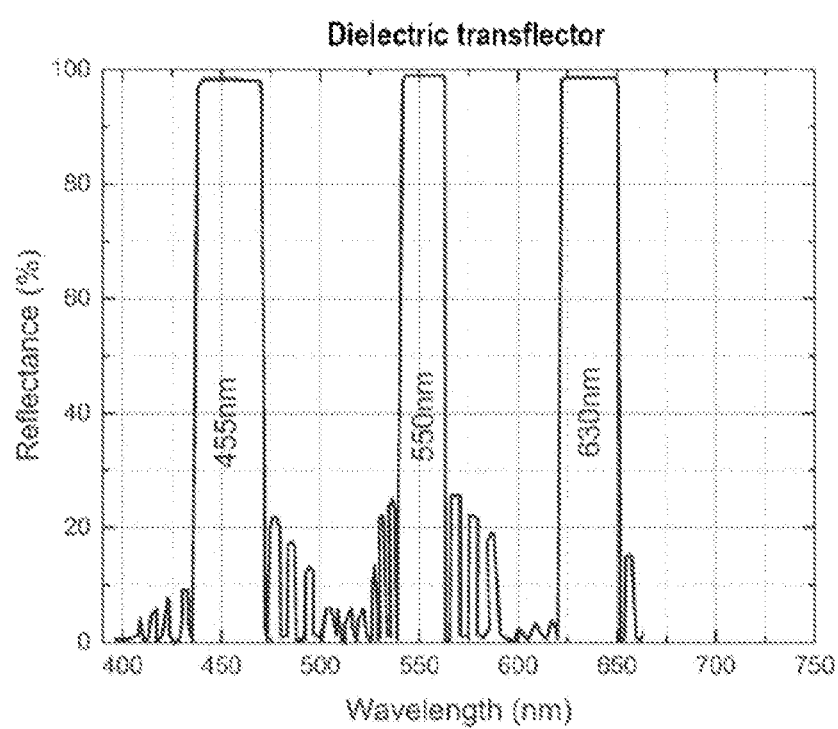
FIG. 5 is a graph illustrating reflectance versus wavelength for one aspect of the present disclosure.

An example of a transflector with a non-uniform reflectance is illustrated in FIG. 5. In this example, a dielectric transflector is designed which has high reflectance corresponding to narrow reflectance bands of the display such as for the bands 67, 68, and 69 described above. The output of the display is expected to correspond to the reflectance bands thus providing maximum brightness of the display.

The reflectance of the dielectric transflector band may be greater than about 40%. In other instances, the reflectance of the dielectric transflector may be greater than about 60% or even greater than about 80%. As the reflectance of the bands is tuned to different reflectance levels, the transmittance will be varying based on the following formula: transmittance=100%−reflectance−absorption. For a dielectric transflector the absorption may be relatively low and may be approximated as zero for illustrative purposes. Example I in Table 1 shows the example where a reflectance band is set at 80% and with secondary surfaces having reflectance values of 0.3%. The net reflectance drops to 0.06% and the DIR values are at approximately 1350. This would represent a case with very good double image characteristics. Example J in Table 1 demonstrates that the net reflectance off of the secondary surfaces could be increased to 0.4% while still maintaining DIR values of approximately 200. The absolute reflectance is at 2% for the surfaces to attain a net reflectance of 0.4%. The color rendering of the display in this embodiment will be based on the relative intensity of the light output from the display and the reflectance of the corresponding band. The intensity of the display and/or intensity of the reflectance may be adjusted either alone or together to get the appropriate reflected CRI. The transmitted CRI will be affected by the width and intensity of the reflectance bands. The balance of the transmittance spectra may be adjusted as needed to get the appropriate CRI desired for the application.

Figure 6:
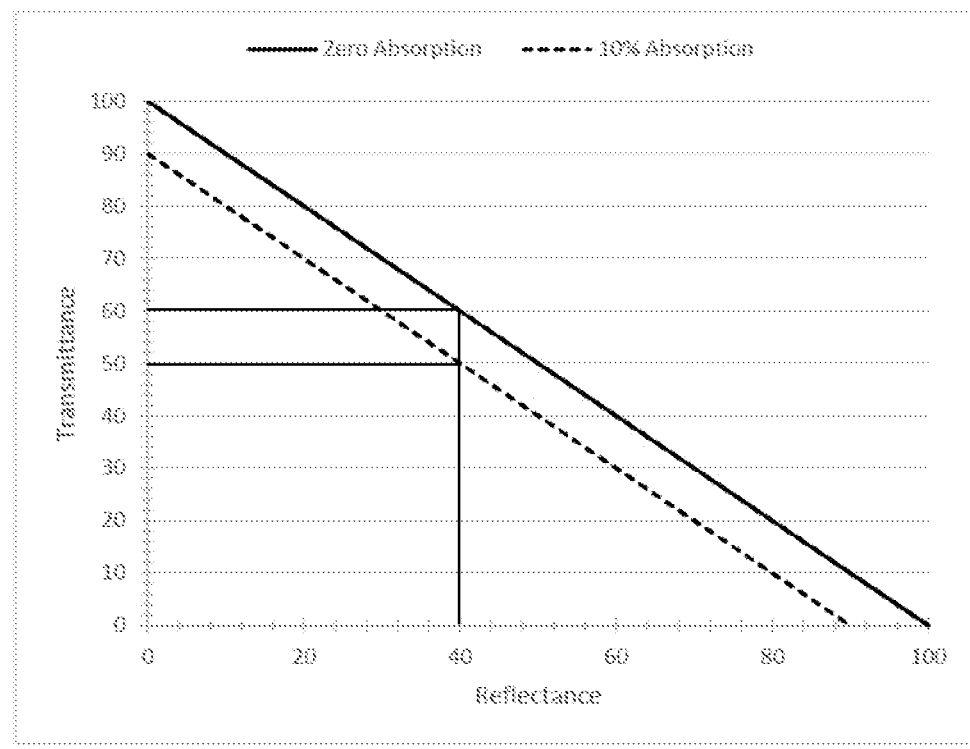
FIG. 6 is a graph illustrating transmittance versus reflectance for one aspect of the present disclosure.

The electro-optic assembly 10 may be used in different automotive or other vehicles. The transmittance of the windshield and other factors will affect the desired maximum transmittance of the electro-optic assembly 10. FIG. 6 illustrates the relationship between reflectance and transmittance for an electro-optic assembly 10 with no absorption and with 10% absorption. Essentially, the zero absorption ideal state defines the maximum transmittance allowable for a given reflectance level. Two transmittance levels are highlighted for illustrative purposes. The desired reflectance is 40%, which equates to a maximum transmittance of 60%, while the transmittance will be 50% if the absorption is 10%. Obviously, the transmittance may then be tuned to lower levels by increasing the absorption of the system. As noted previously, positioning the elements in the electro-optic assembly 10 forward of as many interfaces as possible will help in attaining the target DIR values.

In practice, because the electro-optic assembly 10 has two roles, to reflect display light and transmit ambient light, there will be competing priorities for these two needs. The reflectance may be between about 10% and 60%, may be between about 15% and 50% or may be between about 20% and 40%. The transmittance may be greater than about 20%, may be greater than about 30%, or may be greater than about 40%. The transmittance plus the reflectance is less than 100%, alternatively less than 80%, or alternatively less than 65%. The characteristics of the device may also be altered so that the low end transmittance is less than about 15%, or less than about 7.5% or less than about 5%. In some embodiments, low end transmittance levels down to 2.5% or less may be desirable. The darkened state of the electro-optic assembly 10 may be controlled to any level between the clear state and the low end state.

The selection of desired reflectance levels is influenced by the orientation of the display relative to the combiner and the viewer. When the orientation is close to normal incidence the two reflected polarization states, s and p, behave essentially the same and there is no reason to consider the two states independently. As the angle shifts substantially away from normal incidence the reflectance behavior of the s and p polarization states differs. This differing behavior in the reflectance leads to opportunities to optimize the polarization states of the combiner and the display system to enable high DIR values. It is understood that the DIR values may be different between the two polarization states and that the design of the electro-optic assembly 10 may be optimized for one polarization state or the other.

Figure 7:
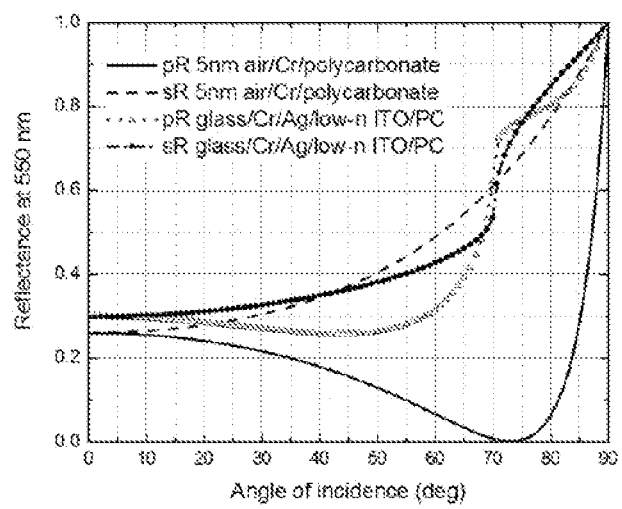
FIG. 7 is a graph illustrating reflectance versus angle of incidence for one aspect of the present disclosure.

With reference now to FIG. 7, the reflectance of the s and p polarization states for an example coating used in a combiner which does not have the ability to adjust the transmittance is illustrated. The s polarization reflectance continuously increases with increasing angle while the p polarization state goes through a reflectance minimum as the angle approached 70 degrees. The reduction in the p polarization state with angle for these traditional coatings is why the display/combiner systems are set up for s polarization. The use of s polarization avoids the drop off of display intensity as the viewing angle may be changed. The drawback to this approach is that there can be substantial veiling glare associated with the combiner.

In the case where a specialized coating comprising a metallic chrome base layer, a silver transflective layer, and an indium tin oxide (ITO) top coat is used in a second surface transflector orientation, entitled "SECOND SURFACE TRANSFLECTOR FOR ELECTRO-OPTIC DEVICE," and AUTO 02215US (GEN010 P917A), entitled "ELECTRO-OPTIC ELEMENT WITH IMI LAYER," the entire discloses of which are incorporated herein by reference. The difference in reflectance between the s and p polarization states is reduced and the p polarization state does not substantially change up to 60 degrees. Therefore, several benefits can be obtained with the use of properly designed coatings and targeted polarization states. Selecting the polarization state of the display to correspond with the p polarization state leads to a stable reflectance with angle. An additional benefit, described in more detail herein, is that the use of the p polarization state enables improved anti-reflective coatings to be designed for the secondary surfaces.

Figure 8:
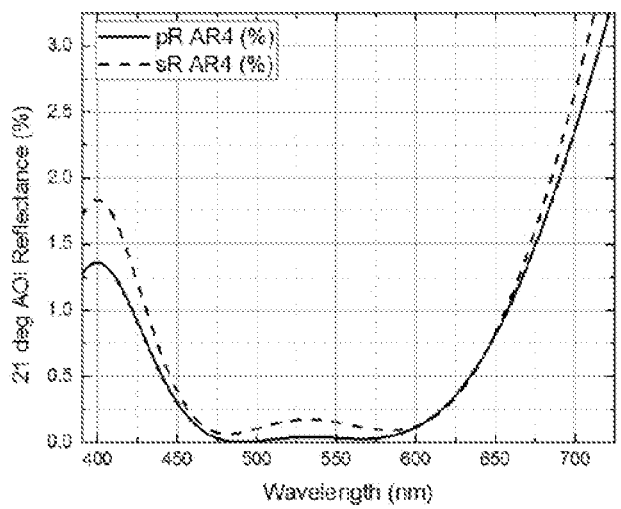
FIG. 8 is a graph illustrating a 21 degree angle of incidence reflectance versus wavelength for one aspect of the present disclosure.

With reference now to FIG. 8, the reflectance versus wavelength for a coating optimized for the s polarization state with a 21 degree angle of incidence is illustrated. Specifically, the p and s polarized reflectance is for an HLHL AR stack on an air/glass interface. The reflectance of the coating for the p polarization state is consistently less than that of the s polarization state even though the stack was optimized for s polarization. The lower reflectance for the anti-reflection coating thus leads to higher DIR values and less double image. The fundamental difference in s and p polarization states with angle and having a properly designed coating/display system thus leads to devices with higher DIR values.

Figure 9:
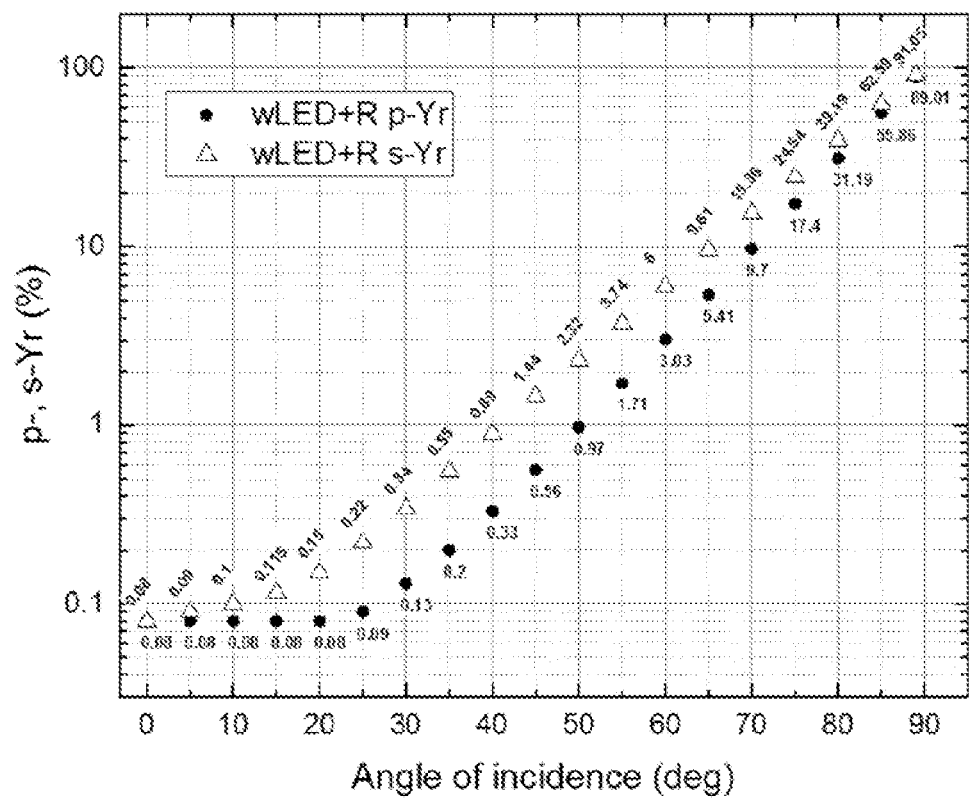
FIG. 9 is a graph illustrating polarized reflectance versus angle of incidence for one aspect of the present disclosure.

With reference now to FIG. 9, the reflectance versus angle for the coating of FIG. 8 is illustrated. The light source is a mixture of light emitted from a white-light light-emitting diode (LED) and a red LED such as depicted by the curve 53 in FIG. 4. The resultant reflectance is normalized to the sensitivity of the human eye to give a CIE Y value. The reflectance of the p polarization state is less than the reflectance of the s polarization state by a factor of approximately 2 to 3 times. In principle, the anti-reflection coating may be optimized for p polarization thus leading to additional relative improvements.

In one embodiment, the system may comprise a display which is configured to emit p polarized light toward the combiner. The combiner would comprise transflective coatings which have angle stabilized reflectance for p polarized light such that the reflectance of the p polarization state does not decrease by more than about 10% absolute from normal incidence to about 30 degrees, or from normal incidence to about 45 degrees, or from normal incidence to about 60 degrees, a variable transmittance system and secondary surfaces with low-reflectance transparent electrodes and/or anti-reflection coatings optimized for minimizing the reflectance of p polarized light. The resultant HUD system would have DIR values greater than about 100, or greater than 200 or even greater than 400. It will be understood that electro-optic assemblies and heads-up display systems suitable for p polarization light may be extended to heads-up display combiners, wherein the combiner does not change transmittance due to activation of an electro-optic material. In this embodiment, the heads-up display combiner may include a single substrate 12 with first and second surfaces 16, 18. The transflector coating 70, with angle stable reflectance, may be present on either the first surface 16 or the second surface 18 and the opposite surface may have an anti-reflection coating optimized for p polarized light.

Increasing the clear state transmittance may be obtained by the use of coatings and materials which have low absorption, as will be described herein. Lower low-end transmittances may be obtained through the inclusion of materials which have higher absorption. If a wide dynamic range is needed, then low absorption materials may be used in combination with electrochromic materials and cell spacing which attain higher absorbances in the activated state. In addition to the dynamic range (difference between clear state and low end state), the speed and uniformity of darkening are also desirable traits. These two traits may be simultaneously attained by proper selection of electrode properties and conductive bus designs. Those skilled in the art will recognize that there exists a multitude of combinations of coatings and electrochromic materials, cell spacings and coating conductivity levels which can be selected to attain particular device characteristics.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A variable transmittance electro-optic assembly, comprising:
    a first partially reflective, partially transmissive substrate defining a first surface and a second surface;
    a second partially reflective, partially transmissive substrate defining a third surface and a fourth surface, wherein the first substrate and the second substrate are configured to be held in a parallel spaced apart relationship and sealed about a perimeter of the first and second substrates;
    an electro-optic material positioned between the second surface and the third surface, wherein the electro-optic assembly includes a principle transflector having a transflector coating on at least one of first and second surfaces, wherein the principle transflector includes narrow reflectance bands corresponding to narrow display light output bands; and
    low reflectance coatings disposed on secondary surfaces of said variable transmittance electro-optic assembly, such that the electro-optic assembly has a high double image characteristic defined by a ratio of a reflectance of the transflector coating to a net reflectance of at least one of the secondary surfaces, and further wherein the ratio is greater than 50.

2. The variable transmittance electro-optic assembly of claim 1, wherein the electro-optic assembly is operably coupled with a heads up display system for a vehicle.

3. The variable transmittance electro-optic assembly of claim 1, wherein the transflector coating is on the second surface.

4. The variable transmittance electro-optic assembly of claim 1, wherein the reflectance of the transflector coating is between 10% and 60%.

5. The variable transmittance electro-optic assembly of claim 1, wherein the reflectance of the transflector coating is between 20% and 40%.

6. The variable transmittance electro-optic assembly of claim 1, wherein the electro-optic material is operable between a darkened state and a clear state, and wherein a transmittance in the clear state is greater than 20%.

7. The variable transmittance electro-optic assembly of claim 6, wherein the transmittance in the clear state is greater than 30%.

8. The variable transmittance electro-optic assembly of claim 1, wherein a sum of the reflectance and transmittance is less than 80%.

9. The variable transmittance electro-optic assembly of claim 1, wherein the low end transmittance is less than 7.5%.

10. The variable transmittance electro-optic assembly of claim 1, wherein the principle transflector includes generally uniform reflectance.

11. The variable transmittance electro-optic assembly of claim 1, wherein the principle transflector includes enhanced reflectance corresponding to display light output bands.

12. The variable transmittance electro-optic assembly of claim 1, wherein the resistance of the narrow reflectance bands are greater than 40%.

13. The variable transmittance electro-optic assembly of claim 1, wherein the secondary surfaces include a net reflectance that is less than 0.25%.

14. The variable transmittance electro-optic assembly of claim 1, wherein the low reflectance coatings on the secondary surfaces have reflectance spectra configured to anti-reflect the display light output intensity versus wavelength.

15. The variable transmittance electro-optic assembly of claim 1, further comprising:
a CRI value is greater than 90 for at least one of reflectance and transmittance.

16. The variable transmittance electro-optic assembly of claim 1, further comprising:
a C* value is less than 10 for at least one of reflectance and transmittance.

17. The variable transmittance electro-optic assembly of claim 1, wherein each of the secondary surfaces have a double image ratio of greater than 100.

18. The variable transmittance electro-optic assembly of claim 1, wherein the reflectance is measured in view of at least one of eye weighted CIE Y, an average over display wavelength range, a weighted average over display wavelength range, and a reflectance of narrow band reflectors.

19. A variable transmittance electro-optic assembly, comprising:
a first partially reflective, partially transmissive substrate defining a first surface and a second surface;
a second partially reflective, partially transmissive substrate defining a third surface and a fourth surface, wherein the first substrate and the second substrate are configured to be held in a parallel spaced apart relationship and sealed about a perimeter of the first and second substrates;
an electro-optic material positioned between the second surface and the third surface;
a principle fixed transflector including a transflector coating disposed on at least one of the first and second surfaces, wherein the principle fixed transflector is configured such that a reflectance of p polarized light is angle stabilized; and
low reflectance coatings disposed on secondary surfaces of said variable transmittance electro-optic assembly, and configured for p polarized light such that the electro-optic assembly has a high double image characteristic defined by a ratio of the reflectance of the transflector coating to a net reflectance of at least one of the secondary surfaces, and further wherein the ratio is greater than 100, wherein the reflectance is measured in view of at least one of eye weighted CIE Y, an average over display wavelength range, a weighted average over display wavelength range, and a reflectance of narrow band reflectors.

* * * * *